US005901941A

United States Patent [19]
Ricco

[11] Patent Number: 5,901,941
[45] Date of Patent: May 11, 1999

[54] ELECTROMAGNETIC METERING VALVE FOR A FUEL INJECTOR

[75] Inventor: Mario Ricco, Bari, Italy

[73] Assignee: Elasis Sistema Ricerca Fiat Nel Mezzogiorno Societa Consortile Per Azioni, Pomigliano D'Arco, Italy

[21] Appl. No.: 08/675,535

[22] Filed: Jul. 3, 1996

[30] Foreign Application Priority Data

Jul. 14, 1995 [IT] Italy .................................. TO95A0600

[51] Int. Cl.[6] ...................................................... F16K 31/06

[52] U.S. Cl. ................................ 251/129.16; 251/129.21; 239/585.3

[58] Field of Search ......................... 251/129.15, 129.21, 251/129.16; 239/585.4, 585.5, 585.1, 585.3

[56] References Cited

U.S. PATENT DOCUMENTS

| | | | |
|---|---|---|---|
| 4,310,123 | 1/1982 | TePastte | 251/129.15 X |
| 4,346,847 | 8/1982 | Rissi | 251/129.15 X |
| 4,646,976 | 3/1987 | Remgold . | |
| 5,170,945 | 12/1992 | Daly et al. | 251/129.22 X |
| 5,271,565 | 12/1993 | Cerny . | |
| 5,370,355 | 12/1994 | Remgold . | |

FOREIGN PATENT DOCUMENTS

| | | |
|---|---|---|
| 0404336 | 12/1990 | European Pat. Off. . |
| 0604914 | 7/1994 | European Pat. Off. . |

*Primary Examiner*—Kevin Lee
*Attorney, Agent, or Firm*—Ladas & Parry

[57] ABSTRACT

A metering valve presenting a shutter for a discharge conduit, and an electromagnet in turn presenting a fixed core and a disk-shaped armature detached from and sliding on the stem by means of a sleeve. The stem is guided by a bush, presents a flange movable inside a swirl chamber with a velocity damping effect, and is fitted, prior to assembling the armature and the electromagnet, by means of a ring nut, which presses a flange, forming one piece with the bush, against the body of the valve via the interposition of calibrated washers so selected as to define the travel of the stem.

7 Claims, 2 Drawing Sheets

ELECTROMAGNETIC METERING VALVE FOR A FUEL INJECTOR

BACKGROUND OF THE INVENTION

The present invention relates to an improved electromagnetic metering valve for a fuel injector, in particular for internal combustion engines.

The metering valves of fuel injectors normally comprise a control chamber with a discharge conduit, which is normally kept closed by a shutter. In known metering valves, the shutter is normally kept closed by the armature of an electromagnet, with the aid of a spring, and is released to open the conduit by energizing the electromagnet to move the armature towards the core of the electromagnet.

The armature of known valves is normally connected rigidly to a stem sliding in a guide, and, when closing the discharge conduit, the kinetic energy of the armature and stem is dissipated in the impact of the shutter against the valve. More specifically, in the case of a ball shutter, the kinetic energy is dissipated, via a guide plate and the ball, in the impact against the seat in the valve body. Conversely, when opening the discharge conduit, the kinetic energy due to the return movement of the armature and stem is dissipated in the impact of the stem against a stop.

Such impact generates considerable force, which is proportional to the mass and velocity of the armature and stem, and is inversely proportional to impact time, which is very short. Owing to the hardness of the ball and valve body, the impact when closing the valve results in considerable rebound, which is also generated, when opening the valve, by the impact of the stem against the stop. As such, the movement of the armature, and hence the opening and closing movement of the valve, fails to provide for steady operation of the injector.

Moreover, the armature moves inside a fuel discharge chamber in which the pressure and density of the fuel vary considerably. An increase in the pressure, and hence in the density, of the fuel inside the discharge chamber reduces the velocity of the armature both when opening and closing the valve. Finally, the movement of the armature itself produces, and is seriously affected by, pressure waves in the fuel inside the discharge chamber, thus further impairing steady operation of the injector.

A metering valve has been proposed wherein the armature is made of magnetic material; the stem is made of nonmagnetic material to reduce cost, and is detached from the armature to simplify assembly; and the stem is guided by a sleeve forming one piece with a bell fixed to the injector body, so that the stem is arrested by a very small surface and subject to rebound.

Moreover, the armature, stem and guide are assembled together with the electromagnet, so that the travel of the stem cannot be determined without also assembling the armature and the electromagnet, and cannot be measured easily for test purposes.

SUMMARY OF THE INVENTION

It is an object of the present invention to provide a highly straightforward, reliable metering valve of the above type, designed to overcome the aforementioned drawbacks typically associated with known devices, and which provides for perfectly steady operation of the injector.

According to the present invention, there is provided a metering valve comprising a shutter for a discharge conduit of a control chamber of an injector; and an electromagnet presenting a fixed magnetic core and a movable armature for controlling said shutter; said armature acting on said shutter by means of an element normally pushed elastically to keep said shutter in a position wherein said conduit is closed; and said element being guided by guide and travel arresting means; characterized in that said element comprises a portion housed in a swirl chamber communicating with a discharge chamber; said portion presenting a surface which is arrested against said means and such that the opening movement of said element is dampened by rapid compression and expulsion of the fluid in said swirl chamber.

BRIEF DESCRIPTION OF THE DRAWINGS

Two preferred non-limiting embodiments of the present invention will be described by way of example with reference to the accompanying drawings, in which.

DETAILED DESCRIPTION OF THE INVENTION

Figure 1:
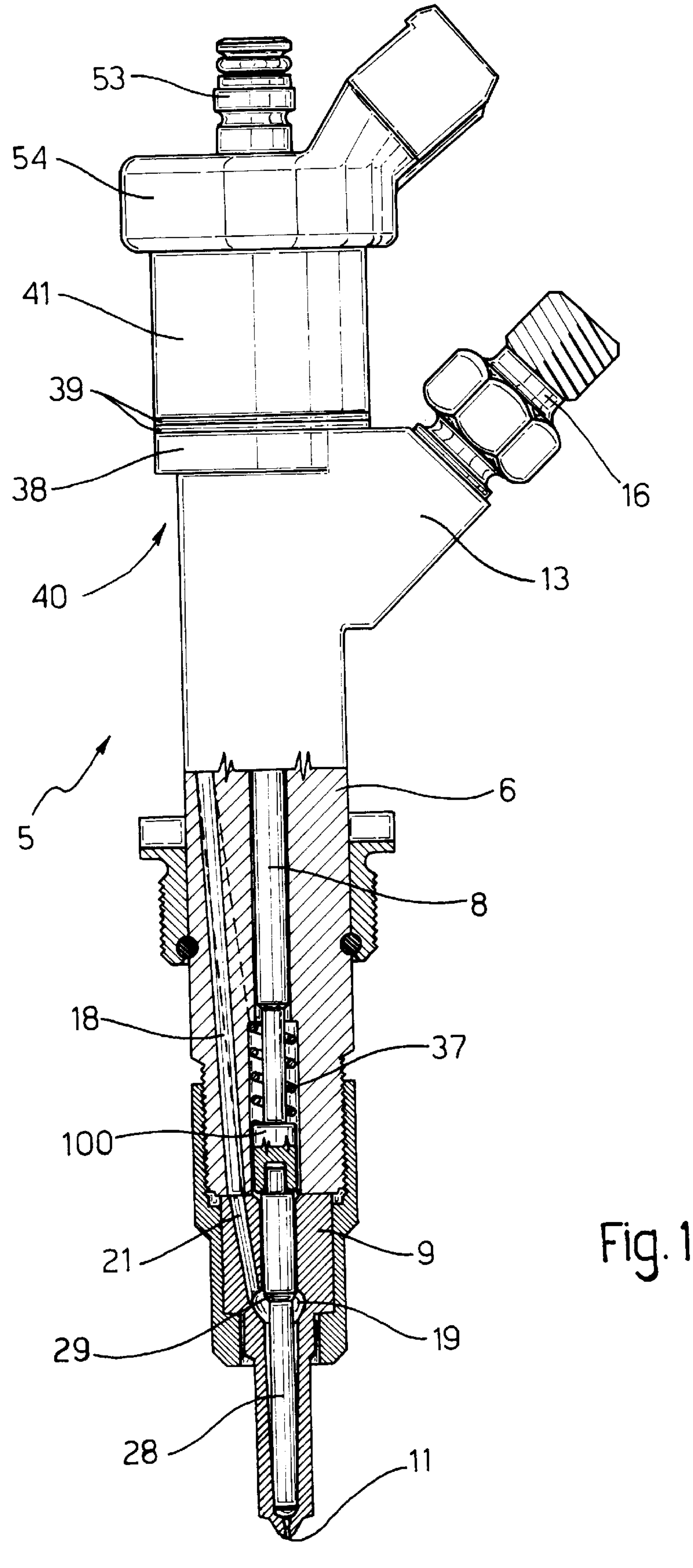
FIG. 1 shows a partly sectioned view of a fuel injector incorporating a metering valve in accordance with the present invention.

With reference to FIG. 1, number 5 indicates a fuel injector, e.g. for a diesel engine, comprising a hollow body 6 in which slides a control rod 8, and which is connected at the bottom to a nozzle 9 terminating with one or more injection orifices 11.

Figure 2:
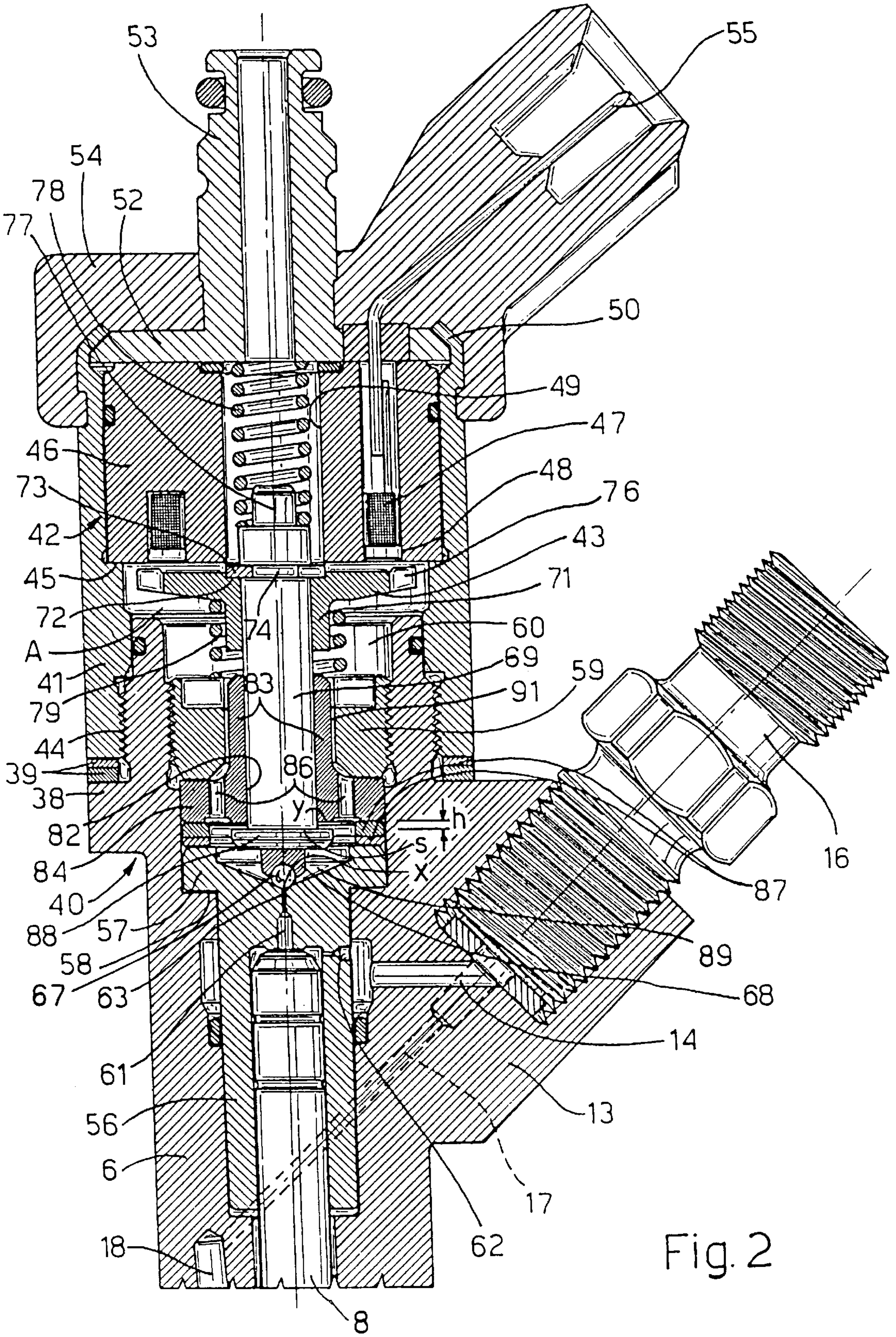
FIG. 2 shows a larger-scale section of the metering valve of the FIG. 1 injector.

Body 6 also presents an appendix 13 in which is inserted an inlet fitting 16 connected to a standard high-pressure fuel supply pump. By means of conduits 17, 18 and 21 (FIG. 1), a hole 14 (FIG. 2) in appendix 13 communicates with an injection chamber 19 of nozzle 9; orifice 11 is normally kept closed by a pin 28 connected to rod 8 by a plate 100; pin 28 presents a shoulder 29 on which the pressurized fuel in chamber 19 acts; and a compression spring 37 assists in pushing plate 100 and hence pin 28 downwards.

Injector 5 also comprises a metering valve 40 comprising a sleeve 41 (FIG. 2) supporting an electromagnet 42 for controlling a disk-shaped armature 43. Sleeve 41 is fitted to body 6 by means of a thread 44 which screws on to an external thread of body 6, and sleeve 41 presents a shoulder 45 on which rests a magnetic core 46 of electromagnet 42. Between the bottom edge of sleeve 41 and a shoulder 38 of body 6, there are fitted a number of calibrated washers 39 so selected as to define the axial position of core 46 at a predetermined distance from the top surface of disk 43.

Core 46 is annular and presents a central hole 49; an annular seat 48 of core 46 houses a standard electric coil 47 for activating electromagnet 42; sleeve 41 presents a bent edge 50 connecting core 46 to a disk 52 forming one piece with a discharge fitting 53 coaxial with hole 49 and connected to the fuel tank; and a cover 54 made of insulating material and fitted with a standard pin 55 of coil 47 is co-molded in known manner on to sleeve 41.

Metering valve 40 also comprises a body 56 presenting a flange 57, which is normally kept contacting a shoulder 58 of body 6 of the injector by a ring nut 59; ring nut 59 is threaded externally and screwed on to a thread of a discharge chamber 60 formed in body 6 as explained in more detail later on; and chamber 60 extends axially from the top surface of body ring nut 59 of valve 40 to the bottom surface of core 46.

Body 56 of valve 40 also presents an axial control chamber 61 communicating with a calibrated radial inlet conduit 62, and with a calibrated axial discharge conduit 63; inlet conduit 62 communicates with hole 14; control chamber 61 is defined at the bottom by the top surface of rod 8; and, by virtue of the greater area of the top surface of rod 8 as compared with that of shoulder 29 (FIG. 1), the pressure of the fuel, with the aid of spring 37, normally keeps rod 8 in such a position as to close orifice 11 of nozzle 9.

Discharge conduit 63 of control chamber 61 is normally kept closed by a shutter in the form of a ball 67, which rests in a conical seat formed by the plane of contact "X" with conduit 63. Ball 67 is guided by a guide plate 68 on which acts a stem 69 associated with disk 43; and disk 43 forms one piece with a sleeve 71 sliding axially on stem 69, presents a shoulder 72 engaged by an open ring 73 fitted inside a groove 74 on stem 69, and presents slots 76 to improve the armature magnetically and hydrodynamically and to assist fuel flow from chamber 60 to central hole 49 of core 46.

Stem 69 extends a given length inside hole 49, and terminates with a small-diameter portion 77, which provides for supporting and anchoring a first compression spring 78 housed inside hole 49, between stem 69 and disk 52. A second compression spring 79, of much greater flexibility than spring 78, i.e. having a much weaker force than spring 78, is fitted between disk 43 and ring nut 59, and normally keeps disk 43 resting on open ring 73 of stem 69. It should be pointed out that disk 43 moves inside an ample portion "A" of discharge chamber 60—which is normally full of air-fuel mixture—and therefore generates pressure waves.

Stem 69 slides inside a guide 82 comprising a cylindrical bush 83, and a bottom flange 84 presenting axial holes 86; flange 84 is forced by ring nut 59 against flange 57 of body 56 of valve 40 with the interposition of calibrated washers 87 so selected as to define the travel "h" of stem 69; and stem 69 presents an integral bottom flange 88 with a considerable surface "S" by which stem 69 is arrested against the bottom surface "Y" of flange 84.

Flange 88 of stem 69 is housed inside a swirl or "squish" chamber 89 in which the fluid between surface "S" of flange 88 and the corresponding surface "Y" of flange 84 is compressed between said surfaces (S and Y) to dampen the movement of stem 69 and disk 43 ("squish" effect). Bush 83 and ring nut 59 form a gap 91 enabling the fluid to flow from chamber 89 through holes 86 into discharge chamber 60.

Ring nut 59 locks washers 87, guide 82 of stem 69 and body 56 of metering valve 40 to injector body 6, which is deformed elastically by the axial force generated by the tightening torque of ring nut 59. When body 56 is subjected to high pressure in chamber 61, the axial force opposes that generated by the tightening torque to restore the elastic deformation of body 6. Since ring nut 59 locks both guide 82 and body 56 of valve 40, however, said elastic deformation in no way affects the mutual position of plane "X" and surface "Y", so that there is no variation in travel "h" of stem 69.

Metering valve 40 of injector 5 operates as follows.

When coil 47 is energized, core 46 attracts disk 43 which, by means of shoulder 72 and ring 73, positively raises stem 69 in opposition to spring 78; and flange 88 of stem 69 generates inside swirl chamber 89 a swirling or squish effect by which the fluid in chamber 89 is compressed and expelled to dampen the stoppage of stem 69 and so prevent rebound and provide for steadier operation of metering valve 40 and injector 5.

Though stem 69 is arrested with flange 88 against the surface of flange 84 of guide 82, and disk 43 is arrested with shoulder 72 against ring 73, the respective kinetic energies are absorbed separately by virtue of disk 43 being detached from stem 69. Since disk 43 moves in portion "A" of chamber 60, its movement is also slowed, thus further reducing the kinetic energy to be absorbed, while the variation in pressure in portion "A" in no way affects the movement of stem 69.

The pressure of the fuel in chamber 61 therefore opens shutter 67 to discharge the fuel in chamber 60, which is fed back to the tank; and the pressure of the fuel in chamber 19 (FIG. 1) acts on shoulder 29 of pin 28 to raise pin 28 and inject the fuel in chamber 19 through orifice 11.

When coil 47 (FIG. 2) is de-energized, spring 78 pushes down stem 69, which, via ring 73, lowers disk 43; the kinetic energy of disk 43 is dissipated by spring 79 independently of that of stem 69; and the kinetic energy of stem 69 is partly dissipated by the swirling or "squish" effect generated by flange 88 in the fluid inside chamber 89.

As a result, the impact of stem 69 on plate 68, of plate 68 on ball 67, and of ball 67 on the seat in discharge conduit 63, is greatly reduced with substantially no rebound; ball 67 closes discharge conduit 63; the pressurized fuel restores the pressure inside control chamber 61; and pin 28 (FIG. 1) closes orifice 11.

The structure of metering valve 40 also provides for defining and/or measuring the travel "h" of stem 69 without assembling core 46 or disk 43 to body 6. Travel "h" in fact is defined by appropriately selecting and fitting calibrated washers 87 between body 56 of valve 40 and guide 82 of stem 69 by means of ring nut 59. At which point, spring 79 and sleeve 71 are fitted on to stem 69, and disk 43 is locked in place by inserting open ring 73 inside groove 74.

Since stem 69 at this point is maintained contacting guide 82 by spring 79 and disk 43, the travel "h" of stem 69 is measured by simply placing the end of a normal travel gauge on the top end of portion 77 of stem 69, and moving stem 69 until ball 67 contacts its seat. Finally, body 6 is closed by assembling sleeve 41 fitted beforehand with disk 52, electromagnet 42 and spring 78.

The advantages of metering valve 40 will be clear from the foregoing description. In particular, stop surface "S" of flange 88 and the "squish" effect provide for eliminating rebound of stem 69 both when opening and closing shutter 67; the fact that disk 43 is detached from stem 69 reduces the kinetic energy to be dissipated by stem 69 on striking flange 84 and on ball 67 striking its seat; and the arrangement of guide 82 and stem 69 enables the travel of stem 69 to be defined and/or measured without assembling electromagnet 42.

Clearly, changes may be made to the metering valve as described and illustrated herein without, however, departing from the scope of the present invention.

I claim:

1. An electromagnetic metering valve for a fuel injector, comprising a control chamber (61) supplied with fuel under pressure, a discharge conduit (63) for discharging the fuel of said control chamber (61), a shutter (67) for said discharge conduit (63), a discharge chamber (60) communicating with said conduit (63), and an electromagnet (42) presenting a fixed magnetic core (46) and a movable armature (43) for controlling said shutter (67); said armature (43) being associated with a stem (69) provided with a first flange (88) for controlling said shutter (67), a first spring (78) normally pushing said stem (69) with a predetermined force to keep said shutter (67) in a position closing said discharge conduit (63); said stem (69) being guided by stationary guide and travel arresting means (82), wherein said first flange (88) is provided with a first surface (S), and said guide and travel arresting means (82) comprise a bush (83) slidably guiding said stem (69), and a second flange (84) fitted to a body (56) of the valve; said second flange (84) being provided with a second surface (Y) adapted to be engaged by the first surface (S) to arrest said first flange (88), said second flange (84) defining a swirl chamber (89) located between said discharge conduit (63) and said discharge chamber (60) and housing said first flange (88), wherein an opening movement of said first flange (88) is dampened by rapid compression and expulsion of the fuel in said swirl chamber (89) between said first surface (S) and said second surface (Y).

2. The valve as claimed in claim 1, characterized in that said flange (84) is forced against said body (56) by a threaded ring nut (59) cooperating with a thread of a body (6) of the injector, so that the distance (h) between said corresponding surface (Y) and a plane of contact (X) of said shutter (67) with said discharge conduit (63) is unaffected by the forcing of said ring nut (59).

3. The valve as claimed in claim 2, characterized in that said first spring (78) is located inside said core (46), between said stem (69) and a fixed member (52); said second spring (79) being located between said disk (43) and said ring nut (59).

4. The valve as claimed in claim 2, characterized in that said bush (83) is fixed by said threaded ring nut (59) via the interposition of calibrated washers (87) prior to assembling said disk (43) and said electromagnet (42); said washers (87) being so selected as to achieve a predetermined travel (h) of said stem (69).

5. The valve as claimed in claim 1, wherein said core (46) is annular, said armature is in form of a disk (43) integral with a sleeve (71), and said stem (69) is perpendicular to said disk (43) and detached therefrom, said stem (69) being slidable inside said sleeve (71) and being provided with a shoulder (72) adapted to arrest said disk (43), said disk (43) being urged by a second spring (79) having a weaker force than said first spring (78) and being movable within a portion (A) of said discharge chamber (60), which is so ample that rebound of said disk (43) when arrested and variations in the conditions of the fuel in said discharge chamber (60) have a negligible effect on the movement of said stem (69).

6. The valve as claimed in claim 5, characterized in that said stem (69) arrests said disk (43) by means of an open ring (73) inserted inside a groove (74) on said stem (69).

7. The valve as claimed in claim 6, characterized in that said electromagnet (42) and said fixed member (52) are fitted to a sleeve (41) presenting a thread (44) which is screwed to an external thread of said body (6) of the injector via the interposition of further calibrated washers (39) so selected as to define the position of said core (46) in relation to said stem (69).

* * * * *